United States Patent [19]

Maxson et al.

[11] 4,115,606

[45] Sep. 19, 1978

[54] METHOD FOR RETARDING SCALE FORMATION

[75] Inventors: Orwin G. Maxson; Gary D. Achenbach, both of Ponca City, Okla.

[73] Assignee: Continental Oil Company, Ponca City, Okla.

[21] Appl. No.: 827,916

[22] Filed: Aug. 26, 1977

Related U.S. Application Data

[63] Continuation of Ser. No. 695,276, Jun. 11, 1976, abandoned, which is a continuation-in-part of Ser. No. 550,306, Feb. 18, 1975, abandoned, which is a continuation of Ser. No. 366,929, Jun. 4, 1973, abandoned.

[51] Int. Cl.$^2$ .......................... B05D 7/14; B05D 3/10
[52] U.S. Cl. ..................................... 427/386; 427/331; 427/334; 427/388 R
[58] Field of Search ................... 427/331, 386, 388 R, 427/334

[56] References Cited

U.S. PATENT DOCUMENTS

| 2,152,536 | 3/1939 | Cooper | 134/39 |
| 3,050,490 | 8/1962 | Nitzsche et al. | 260/37 |

FOREIGN PATENT DOCUMENTS

| 1,036,078 | 7/1966 | United Kingdom | 427/386 |

*Primary Examiner*—James R. Hoffman
*Attorney, Agent, or Firm*—Richard W. Collins

[57] ABSTRACT

Scale formation on metallic surfaces exposed to liquids containing scale-forming components is retarded by coating the surfaces with a mixture of a low surface energy polymer having hydrophobic properties and a low surface energy filler having hydrophilic properties.

4 Claims, No Drawings

METHOD FOR RETARDING SCALE FORMATION

This is a continuation of application Ser. No. 695,276, filed June 11, 1976, which is a continuation-in-part of application Ser. No. 550,306, filed Feb. 18, 1975, which in turn is a continuation of application Ser. No. 366,929, filed June 4, 1973, all of said applications now abandoned.

BACKGROUND OF THE INVENTION

1. Field of the Invention

This invention relates to a method for retarding scale formation on metal surfaces in contact with liquid containing scale-forming components.

2. Description of Prior Art

Metal equipment is often used to transport, handle, and process a wide variety of liquids. These liquids sometimes contain components which, under certain conditions, tend to plate out as a scale or deposit upon the metal surfaces with which they are in contact. Such scale deposition tends to decrease heat transfer, create hot spots, at least partially plug the system, and is generally detrimental. A method which would decrease the tendency of such scale formation and cause sloughing of any scale that does form has long been sought.

One popular method of scale prevention involves addition of a scale prevention additive to the liquid which contains the scale-forming components. A large number of additives are commercially available for a wide range of systems. Another approach has been to treat the surface with which the liquid comes in contact. One type of treatment of the surface involves coating the surface with a material which is less conducive to scale formation. Another type of treatment involves polishing the surface to a very smooth finish, thereby reducing the tendency of deposit formation. Numerous other chemical and physical treatment techniques have been utilized.

SUMMARY OF THE INVENTION

The method of this invention involves applying a mixture of a low surface energy polymer having hydrophobic properties and a low surface energy filler having hydrophilic properties, such as boron nitride, to a surface prior to exposing the surface to a liquid containing scale-forming components. The mixture is prepared by mixing together the polymer in liquid form and filler in particulate form to provide a fluid composition. The resulting fluid composition is applied to the metal surface with which the liquid containing the scale-forming components will come in contact, and the coating composition is allowed to solidify and adhere to the metal surface. Subsequent exposure of the coated surface to a scale-forming liquid does not result in a scale problem as great as if the uncoated surface were exposed.

DESCRIPTION OF THE PREFERRED EMBODIMENT

The coating composition applied to a surface according to his invention may be applied to any one of a wide variety of metals commonly used to contain, transport, and process fluids. Examples of such metals include iron, steel, aluminum, brass, and the like. Of particular interest are the metals used in equipment in which liquids are either heated or cooled, such as heat transfer tubes, hot water heaters, steam irons, tea kettles, steam boilers, petroleum production conduits, pumping equipment, and the like.

The coating composition is effective with either aqueous or oil base liquids containing potential scale-forming components. Of particular interest are the liquids associated with the production and handling of petroleum, such as crude oil and brine and water which contains scale-forming components.

The reason for precipitation of the scale from the liquid onto the metal surface varies with the particular system in question. Often a change in temperature of a fluid will scale formation. This temperature change can be an increase such as occurs when liquids are being heated during processing or a decrease such as occurs when liquids from a relatively hot subterranean formation are produced to the relatively cool surface of the ground. In other instances, escape from the system of some volatile component will cause the liquid to become saturated with some scale-forming component or components. The scale then comes out of solution and adheres to any metal surface with which it is in contact.

One component of the coating composition used in this invention is a low surface energy polymer having hydrophobic properties. By the term "low surface energy" material is meant, a material which has a surface having a low coefficient of friction; e.g. non-sticky, non-tacky surface. Examples of such polymers include epoxy, polyimide, polyurethane and silicone resins. Each of these classes or resins is well known in the art. Epoxy resins are obtained by the condensation of phenol, acetone and epichlorohydrin. The repeating unit of the polymer probably has the structure $-C_6H_4C(CH_3)_2C_6H_4OCH_2CHOHCH_2O-$. The free OH groups may be substituted for by various organic radicals. For a further description of these resins, see Henry Lee "Epoxy Resins, Their Applications and Technology", McGraw-Hill Book Co., New York, 1957.

Polyimide resins can be made from aliphatic diamines and aromatic tetracarboxylic acids, from aromatic diamines and aromatic dianhydrides, or from poly (pyromellitamide acids). A typical example is a polymer derived from pyromellitic dianhydride and an aromatic diamine which has substitutes, such as O-carboxyl groups, which can be further reacted to form heterocyclic rings. It has the following basic structural unit, $[-N(CO)_2C_6H_2(CO)_2NC_6H_4OC_6H_4-]n$. See "Encyclopedia of Polymer Science and Technology", Volume 11, John Wiley and Sons, Inc., New York, 1969.

Polyurethanes are a class of resins obtained by the reaction of diisocyanates with organic compounds containing two or more active hydrogens, such as phenols, amines, hydroxylic and carboxylic compounds, to form polymers having free isocyanate groups. Under the influence of heat or catalysts, the free isocyanate groups react with each other, with water, glycols, diamines, etc., to form a thermo-setting material. For further information, see Bernard A. Donbrow, "Polyurethanes", Reinhold Publishing Co., New York, 1957.

Silicone resins are organopolysiloxane polymers. They are generally prepared by hydrolysis of a silicone compound of the formula $RxSiCl(4-x)$, where R is a hydrocarbon radical or hydrogen and where at least one R is hydrogen. See R. N. Meals and T. M. Lewis, "Silicones", Reinhold Publishing Co., New York, 1959.

The other component of the coating composition used is a low surface energy filler wth hydrophilic properties and a high thermal conductivity. A preferred filler is boron nitride. The filler is preferably used in finely particulated form.

Generally, the filler can be used in an amount from about 0.5 to 50 percent by weight of the polymer constituent. It is preferred to use from about 2 to 25 percent by weight filler in the composition, the remainder being polymer.

The coating can be formed by applying the composition in fluid form substantially uniformly to the surface of a solid metallic substrate which is to be exposed to a scale-forming liquid. The coating is allowed to dry or harden through the action of a catalyst or other polymer solidifying agent to form an adherent coating.

Tests were made to determine the scale-retarding effectiveness of the coating compositions on simulated fire tubes exposed to a scale-forming liquid. Four ⅜-inch diameter holes were spaced spaced around the bottom of a sawed-off segment of a 25 gallon steel drum bath. Each hole was provided with a female threaded connection. Into each hole was screwed a length of ⅜-inch diameter pipe which simulated the fire tubes. Each pipe extended up inside the bath. Each length of pipe comprised three sections which were welded together. One end of a 3-inch long first section was threaded to fit into a hole in the bottom of the bath. This first section was vertical when positioned in the bath. A 3-inch long second section was welded at a right angle to the other end of the first section. This second section was horizontal when positioned in the bath. A 6-inch long third section was welded to the other end of the second section at a right angle to the second section. This third section was vertical when positioned in the bath. The open end of the third section pointed up from the bottom of the bath. Thus, when positioned in the bath, the three-segment length of pipe resembled a Z laying on its side.

Ten gallons of tap water containing 50,000 parts per million sodium chloride, 50 parts per million calcium carbonate, and 3,500 parts per million calcium sulfonate was placed in the bath and around the outside of the tubing segments. Thus, this liquid contained scale-forming components. A thin layer of mineral oil was placed on top of the water to cut down evaporation. About ½-inch of each tubing segment protruded above the level of the liquid in the bath. A lighted bunsen burner was placed below each hole in the bottom of the bath so that hot combustion gases passed up through each tubing segment. The bath was provided with a cooling coil which maintained the temperature of the liquid at 120° F throughout the test period. Prior to insertion into the bath, each tubing segment was given a coating. If boron nitride filler was used in the coating, 10 percent by weight boron nitride was stirred into a liquid polymer, the coating composition applied to the exterior of the tubing segment with a brush and allowed to dry. Other tubing segments were tested with a coating of polymer only or without any coating. The tests were carried out for 21 days. At the end of the test period, the tubing segments were removed from the bath and examined for scale deposits.

EXAMPLE 1

No coating composition was used on the tubing segment. After 21 days, the tubing was coated with a greasy black deposit plus several lumps of a hard black scale deposit on hot spot areas of the tubing. The majority of the scale was on the bottom of the bath around the threaded coupling.

EXAMPLE 2

A coating of epoxy resin was used on the tubing segment. After 21 days, the tubing had a uniform thin brown scale which was tightly adhered. There were several lumps of hard brown scale on hot spots of the tubing.

EXAMPLE 3

A coating of 90 percent by weight epoxy resin and 10 percent by weight boron nitride was used on the tubing segment. After 21 days, the tubing had a thin brown scale over most of its surface, some spots where there was no scale whatsoever and no lumps of deposit anywhere.

EXAMPLE 4

A coating of polyimide resin was used on the tubing segment. After 21 days, the coating had failed by peeling and flaking off. Several lumps of hard deposit were present on the hot spots of the tubing.

EXAMPLE 5

A coating of 80 percent by weight polyimide resin and 20 percent by weight boron nitride was used. After 21 days, the coating had not failed. There was only a small area of a thin film of a dark scale just above the threads in the hot area of the tubing segment. Most of the tubing segment was entirely free of scale.

The above samples show that the addition of boron nitride to the polymers results in a coating which has far greater resistance to scale formation than either uncoated metal or metal coated with polymers alone.

The foregoing discussion and description have been made in connection with preferred specific embodiments of the method. However, it is to be understood that the discussion and description of the invention are only intended to illustrate and teach those skilled in the art how to practice the invention and are not to unduly limit the scope of the invention which is defined in the appended claims.

What is claimed is:

1. In a method for retarding the deposition of scale on a metallic surface wherein said surface is coated prior to exposure to an aqueous or oil base liquid having scale-forming components, the improvement wherein said metallic surface is coated with a fluid mixture of from 98 to 75 percent by weight of a low surface energy polymer selected from the group consisting of epoxy resins and polyimide resins with from 2 to 25 percent by weight of boron nitride filler, and said fluid mixture is allowed to solidify on said metallic surface prior to exposure to said liquid having scale-forming components.

2. The method of claim 1 wherein said low surface energy polymer is epoxy resin.

3. The method of claim 1 wherein said low surface energy polymer is polyimide resin.

4. The method of claim 1 wherein said boron nitride is present in an amount of 10 weight percent of said mixture.

* * * * *